US012586002B2

(12) United States Patent
Phan et al.

(10) Patent No.: US 12,586,002 B2
(45) Date of Patent: Mar. 24, 2026

(54) MULTI-POLYTOPE MACHINE FOR CLASSIFICATION

(71) Applicant: INTERNATIONAL BUSINESS MACHINES CORPORATION, Armonk, NY (US)

(72) Inventors: Dzung Tien Phan, Pleasantville, NY (US); Lam Minh Nguyen, Ossining, NY (US); Jayant R. Kalagnanam, Briarcliff Manor, NY (US); Chandrasekhara K. Reddy, Kinnelon, NJ (US); Srideepika Jayaraman, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 17/491,494

(22) Filed: Sep. 30, 2021

(65) Prior Publication Data
US 2023/0128821 A1 Apr. 27, 2023

(51) Int. Cl.
*G06N 20/10* (2019.01)

(52) U.S. Cl.
CPC .................................... *G06N 20/10* (2019.01)

(58) Field of Classification Search
CPC ....................................................... G06N 20/10
USPC ............................................................ 706/12
See application file for complete search history.

(56) References Cited

U.S. PATENT DOCUMENTS

| | | | |
|---|---|---|---|
| 10,360,517 B2 | 7/2019 | Koch et al. | |
| 10,671,735 B2 | 6/2020 | Gupta et al. | |
| 10,719,301 B1 * | 7/2020 | Dasgupta | .................. G06F 8/34 |
| 10,747,740 B2 | 8/2020 | Majumdar | |
| 11,087,230 B2 | 8/2021 | Sharma et al. | |
| 2014/0140610 A1 * | 5/2014 | Tu | ...................... G06F 18/2155 |
| | | | 382/159 |
| 2015/0234863 A1 * | 8/2015 | Lilje | ...................... G06F 16/50 |
| | | | 382/103 |

(Continued)

FOREIGN PATENT DOCUMENTS

| | | |
|---|---|---|
| CN | 111753874 A | 10/2020 |
| CN | 115935266 A | 4/2023 |

(Continued)

OTHER PUBLICATIONS

Mell, P. et al., "Recommendations of the National Institute of Standards and Technology"; NIST Special Publication 800-145 (2011); 7 Pgs.

(Continued)

*Primary Examiner* — Hope C Sheffield
(74) *Attorney, Agent, or Firm* — CHIP LAW GROUP

(57) ABSTRACT

A computer implemented method of generating a classifier engine for machine learning includes receiving a set of data points. A semi-supervised k-means process is applied to the set of data points from each class. The set of data points in a class is clustered into multiple clusters of data points, using the semi-supervised k-means process. Multi-polytopes are constructed for one or more of the clusters from all classes. A support vector machine (SVM) process is run on every pair of clusters from all classes. Separation hyperplanes are determined for the clustered classes. Labels are determined for each cluster based on the separation by hyperplanes.

22 Claims, 8 Drawing Sheets

(56)                References Cited

U.S. PATENT DOCUMENTS

| | | | |
|---|---|---|---|
| 2015/0262036 A1* | 9/2015 | Song | G06F 16/41 |
| | | | 382/159 |
| 2019/0005324 A1* | 1/2019 | Anisimovskiy | G06V 10/762 |
| 2021/0073642 A1 | 3/2021 | Dribus | |

FOREIGN PATENT DOCUMENTS

| | | |
|---|---|---|
| JP | 2007-115245 A | 5/2007 |
| JP | 2023-051819 A | 4/2023 |

OTHER PUBLICATIONS

Disclosed Anonymously, "Embedding of Pairwise Minimax Distance Measures in Classification Tasks"; IP.com No. IPCOM000252182D (2017); 12 pgs.
Disclosed Anonymously, "X-Ray Fixed Rad Positioner Health Prediction Using Machine Learning Technique"; IP-com-IPCOM000263345D (2020); 6 pgs.
Zhou, M., "Softplus Regressions and Convex Polytopes"; arXiv:1608. 06383v1 [stat.ML] (2016); 55 pgs.
Casale, P. et al., "Approximate Polytope Ensemble for One-Class Classification"; Pattern Recognition (2013); 11 pgs.
Kantchelian, A. et al., "Large-Margin Convex Polytope Machine"; NIPS (2014); 9 pgs.
Wulff, S. et al., "Analytic Center Cutting Plane Method for Multiple Kernel Learning"; Ann Math Artif Intell (2013); 17 pgs.
Djuric, N. et al., "Growing Adaptive Multi-Hyperplane Machines"; Proceedings of the 37 th International Conference on Machine Learning, Online, PMLR 119 (2020); 10 pgs.
Korovkinas, K. et al., "SVM and k-Means Hybrid Method for Textual Data Sentiment Analysis"; Baltic J. Modern Computing (2019); vol. 7:1; pp. 47-60.
Varol, E. et al., "HYDRA: Revealing Heterogeneity of Imaging and Genetic Patterns Through a Multiple Max-Margin Discriminative Analysis Framework"; Neuroimage (2017); pp. 346-364.
Yao, Y. et al., "K-SVM: An Effective SVM Algorithm Based on K-means Clustering"; Journal of Computers (2013); vol. 8:10; 8 pgs.
Wang, Z. et al., "Trading Representability for Scalability: Adaptive Multi-Hyperplane Machine for Nonlinear Classification"; KDD (2011); 10 pgs.
Boser, B. et al., "A Training Algorithm for Optimal Margin Classifiers"; COLT (1992); 9pgs.
The State Intellectual Property Office of People's Republic of China, "First Office Action", Dec. 1, 2025, 09 Pages, CN Application No. 202211063633.8.
Japan Patent Office, "Decision to Grant a Patent" Jan. 8, 2026, 05 Pages, JP Application No. 2022-153416.

* cited by examiner

CLOUD

120

CLASSIFIER ENGINE
110

116

MACHINE LEARNING
CLASSIFICATION ENGINE

INPUT CLASSES
DATA SOURCE

112

113

NETWORK

103(1)

106

103(N)

102(1)

102(N)

100

750

710

754N

754C

754B

754A

700

MULTI-POLYTOPE MACHINE FOR CLASSIFICATION

BACKGROUND

Technical Field

The present disclosure generally relates to data processing, and more particularly, to systems and methods for multi-polytope machine for classification.

Description of the Related Art

Binary classification plays an important role in machine learning and is relevant to many applied domains. Typically, a training set has two groups, sometimes labeled as positive and negative classes. A goal in machine learning is to find a classifier that can determine the correct class for a test point.

In conventional clarification processes, the labeling of data points is generally governed by the equation from constructing a single hyperplane:

$$\min_{w,b,\xi} \frac{1}{2}\|w\|^2 + C\sum_{i=1}^{N}\xi_i$$

$$\text{s.t. } y^i\left(w^T x^i + b\right) \geq 1 - \xi_i, \forall i$$

$$\xi_i \geq 0, \forall i$$

$$\mathcal{D} \equiv \left\{\left(x^1, y^1\right), \ldots, \left(x^N, y^N\right)\right\}$$

Historically, the above equation is subject to numerous errors in classification that impact the efficiency of the classification process. There may occur undesirable overlap between positive and negative data point classes.

One tool used for classification is support vector machine (SVM), which projects the data into a higher dimensional space where a hyperplane can separate the instances of the classes. Previous SVM techniques generate a separator by a single hyperplane that has the largest distance to the nearest training-data point of any class.

There are also other classification machines that are used in polytope applications. For example, one approach finds a single polytope separator with multiple hyperplanes, which encloses one class. Another approach allows for two polytopes corresponding to two classes, without clustering each class.

SUMMARY

According to an embodiment of the present disclosure, a computer implemented method of generating a classifier engine for machine learning is disclosed. The method includes receiving a set of data points. A semi-supervised k-means process is applied to the set of data points. The set of data points is clustered into multiple clusters of data points for each class, using the semi-supervised k-means process. Multi-polytopes are constructed for one or more of the clustered classes. A support vector machine (SVM) process is run on each pair of clusters for all classes. Separation hyperplanes are determined for the clustered classes. Labels are determined for each clustered class based on the separation hyperplanes.

In one embodiment, positive classes of data points are clustered separately from negative classes of data points for binary classification. This feature distinguishes the subject technology in its application to multiple class problems in comparison to conventional classifier machines which are typically implemented on single class applications.

According to another embodiment of the present disclosure, a computer program product for generating a classifier engine for machine learning includes one or more computer readable storage media, and program instructions collectively stored on the one or more computer readable storage media. The program instructions include receiving a set of data points. A semi-supervised k-means process is applied to the set of data points. The set of data points is clustered into multiple clusters of data points for each class, using the semi-supervised k-means process. Multi-polytopes are constructed for one or more of the clustered classes. A support vector machine (SVM) process is run on each pair of clusters for the clustered classes. Separation hyperplanes are determined for the clustered classes. Labels are determined for each clustered class based on the separation hyperplanes.

According to one embodiment, information from one of the clustered classes identified and used as a constraint in determining another of the clustered classes. This feature shows the unconventional aspect available by combining the clustering and SVM techniques into an integrated process. The information becomes available through the combination of techniques and adds the accuracy of classification.

According to another embodiment of the present disclosure, a remote computer server for generating a classifier engine for machine learning includes: a network connection; one or more computer readable storage media; a processor coupled to the network connection and coupled to the one or more computer readable storage media; and a computer program product including: program instructions collectively stored on the one or more computer readable storage media, the program instructions include receiving a set of data points. A semi-supervised k-means process is applied to the set of data points. The set of data points is clustered into multiple clusters of data points for each class, using the semi-supervised k-means process. Multi-polytopes are constructed for one or more of the clustered classes. A support vector machine (SVM) process is run on each pair of clusters for the clustered classes. Separation hyperplanes are determined for the clustered classes. Labels are determined for each clustered class based on the separation hyperplanes.

According to one embodiment, the program instructions may also include determining misclassification measurements in the clustered classes of data points and training the semi-supervised k-means process for improved clustering based on the misclassification measurements. As will be appreciated, these features improve the accuracy of labeling by minimizing the cost of misclassification in the system and improve the training time for the classifier. Providing the misclassification measurements to the clustering part of the system refines the accuracy in clustering data points.

According to yet another embodiment, a software as a service (Saas) computer implemented method for generating a classifier engine for machine learning is disclosed. The method includes receiving a set of data points and a request for classification services from a remote user through a network connection. A local computer server applies a semi-supervised k-means process to the set of data points. The set of data points is clustered into multiple clusters of data points for each class, using the semi-supervised k-means process. Multi-polytopes are constructed for one or more of the clustered classes. A support vector machine (SVM) process is run on each pair of clusters for the clustered classes. Separation hyperplanes are determined for the clustered classes. Labels are determined for each clustered class based on the separation hyperplanes. The determined labels for each clustered class are provided to the remote user.

In one embodiment, the separation hyperplanes are non-linear boundaries between the clustered classes. As will be appreciated, this feature becomes available by the combination of clustering and SVM into an integrated process. Typically, hyperplanes are linear boundaries between just two clusters of data points. The combination of features allows for multiple hyperplanes in a multi-class polytope application and further allows the separation to be bounded by non-linear boundaries by using kernel SVM separator so that separation can be more accurate between clusters.

Moreover, and in general to the embodiments disclosed above, it will be appreciated that features of the subject technology provide improvements to machine learning based classification. The subject technology is usable in binary and multi-class applications which opens up a wider variety of data sets for analysis. In addition, negative clusters are well separated from positive clusters and vice versa. The end result is much more easily interpretable for users when the decision rules are from interpretable hyperplanes. To increase interpretability, we enforce additional constraints for SVM to find interpretable separating hyperplanes with sparse integer coefficients.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods for machine learning, classification of data in machine learning, and training machine learning models in multi-polytope data applications. Aspects of the subject technology address well-known problems in the field of machine learning that arise in systems trying to label a data point into one of two or many groups (typically as a "positive" class and a "negative" class in two groups). In one aspect, the subject technology proposes a unified framework that obtains a new classifier for binary and multi-class classification. In a general embodiment, a method integrates clustering and SVM, where clustering performs grouping and SVM constructs hyperplanes separating the clusters. As will be appreciated, features of the subject technology allow the unconventional combination of a k-means clustering and a SVM to generate the classifier machine. The combination of the k-means clustering and SVM allow for the use of multiple hyperplanes per class that is generally unavailable through other known approaches to classification in machine learning systems. The teachings herein have the technical effect of reducing computing resources used by one or more computing devices performing the machine learning within the system. Examples of such computing resources include, without limitation, processor cycles, network traffic, memory usage, storage space, and power consumption. For example, the resources typically required to perform similar machine learned classification, would require additional machines to operate some of the processes separately. And yet, as will be appreciated, the conventional methods do not arrive at the same classification result because individually, the machines and methods being operated in the prior art have less accuracy in solving the two class (or more) problem in machine learned classification.

Example Architecture

Figure 1:
FIG. 1 is a block diagram of an architecture for a multi-polytope machine learning system for classification, according to an illustrative embodiment.

FIG. 1 illustrates an example architecture 100 for remote repairing of crashed applications. Architecture 100 includes a network 106 that allows various computing devices 102(1) to 102(N) to communicate with each other, as well as other elements that are connected to the network 106, such as an input classes data source 112, a machine learning classification server 116, and the cloud 120. In the context of providing machine learning classification services under the subject disclosure, the computing devices 102(1) to 102(N) may be end user devices that request machine learning classification for various applications including for example, binary and multi-class classification as disclosed herein and in more detail in the following figures. In general, when one of the computing devices 102(1) to 102(N) makes a request for classification of a data set, a classifier engine 110 may receive the input data set from the requesting machine 102 or by way of a third-party source and through the input classes data source 112. The classifier engine 110 may process the input data and provide and output in the form of a multi-polytope classification.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows the classifier engine 110, which is a software program running on a machine learning classification server 116, to communicate with the input classes data source 112, computing devices 102(1) to 102(N), and the cloud 120, to provide machine learning data processing. In one embodiment, the machine learning processes including classification are performed at least in part on the cloud 120, leveraging resources from multiple sources including physical and virtual devices. In cloud based embodiments, resources may be gathered from different computing devices connected to the cloud network.

For purposes of later discussion, several user devices appear in the drawing, to represent some examples of the computing devices that may be the source of machine learning classification requests, and results. Aspects of the application data/documents (e.g., 103(1) and 103(N)) may be communicated over the network 106 with the classifier engine 110 of the machine learning classification server 116. Today, user devices typically take the form of portable handsets, smart-phones, tablet computers, personal digital assistants (PDAs), and smart watches, although they may be implemented in other form factors, including consumer, and business electronic devices.

While the input classes data source 112 and classifier engine 110 are illustrated by way of example to be on different platforms, it will be understood that in various embodiments, the input classes data source 112 and the machine learning classification server 116 may be combined. In other embodiments, these computing platforms may be implemented by virtual computing devices in the form of virtual machines or software containers that are hosted in a cloud 120, thereby providing an elastic architecture for processing and storage.

Example Application

Figure 2:
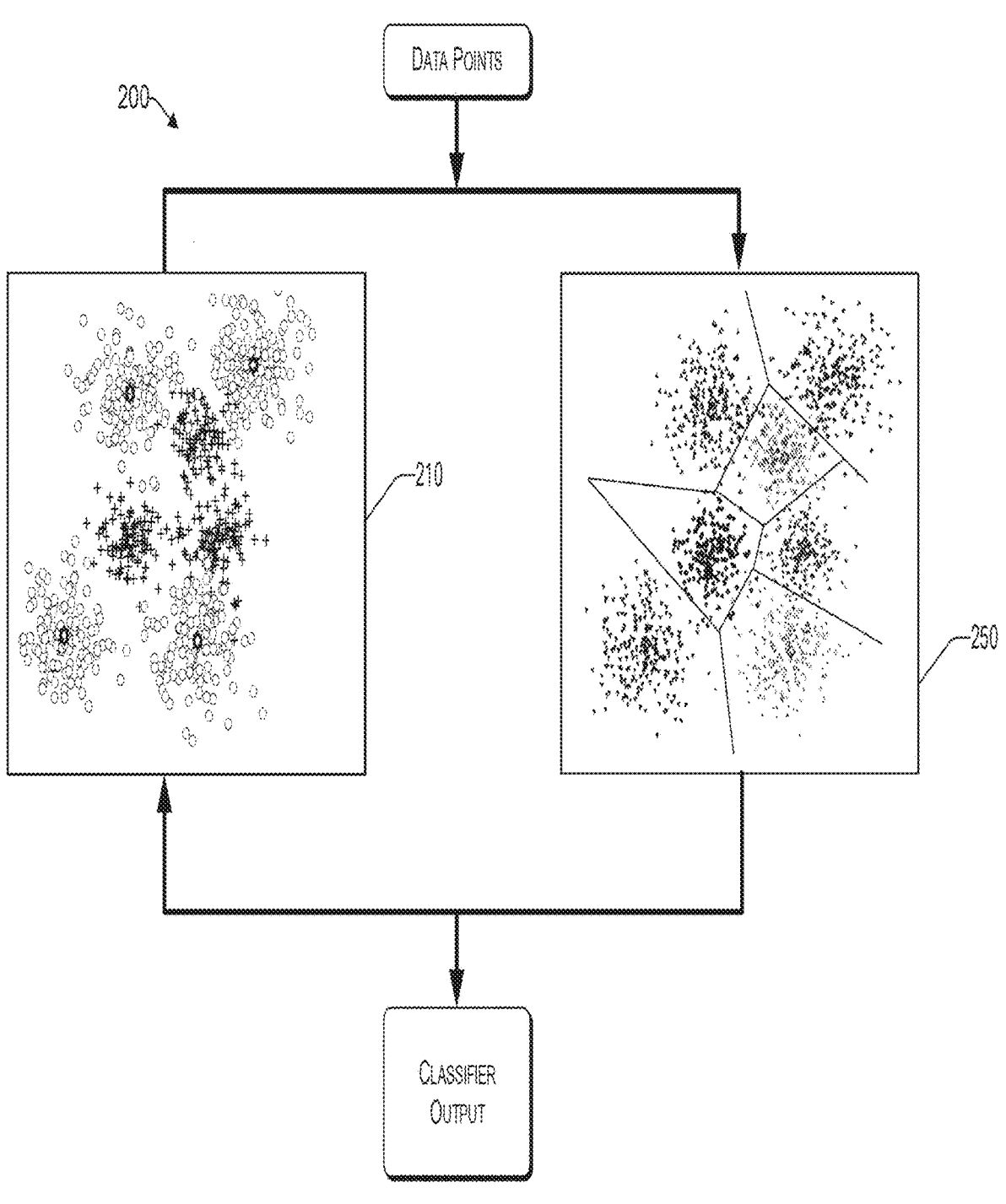
FIG. 2 is a block diagram of training a multi-polytope machine classifier of binary and multi-class data applications, according to an illustrative embodiment.

Referring now to FIG. 2, a classification model 200 for classifying a data set is shown according to an embodiment. In an exemplary embodiment, a set of data points are received by the machine elements for classification processing through machine learning. In the example application, given a set of training data with two labels ("positive" and "negative"), the system may be asked to identify a classifier to separate "positive" and "negative" classes, and predict a label for a new sample. In an exemplary embodiment, the data set may be processed simultaneously under two sub-processes (clustering and separation by hyperplane) to generate the requested classifier. In an exemplary embodiment, the subject technology combines SVM and k-means techniques into a single optimization formulation to obtain a new classifier. The classifier of the subject technology is based on the characteristics of the polytopes along with a k-means clustering method to solve the classification task. Embodiments use the k-means based method for clustering, then utilize SVM to construct hyperplanes between each pair of clusters. A clustering step for each class considers classification loss as well as information from other classes in the allocation of sample points to clusters. The impact of neighbor points to the centroid may be emphasized while minimizing the role of the remote points by using a Gaussian kernel.

In FIG. 2, an input data set is shown being processed by the two different sub-processes in tandem. In an exemplary embodiment, the clustering process uses a semi-supervised k-means method to group the data set into clusters. The embodiments of the classifier described herein may be operated according to the parameters of EQ. 2 and EQ. 3 below. EQ. 2 represents the clustering problem being solved by the classifier machine for the negative class. EQ. 3 represents the clustering problem being solved by the classifier machine for the positive class. A clustering process according to a semi-supervised k-means method is shown in block 210. In an exemplary embodiment, the other sub-process includes using a SVM on the data set to find separators with large margins. Block 250 shows hyperplanes identified by the SVM process applied to the data set.

$$\mathcal{D} \equiv \{(x^1, y^1), \ldots, (x^N, y^N)\}$$

$$\mathcal{D} = (C_1^n \cup C_2^n \cup \ldots \cup C_{K_{neg}}^n) \cup (C_1^p \cup C_2^p \cup \ldots \cup C_{K_{pos}}^p),$$

where $C_i^n$ is a cluster in the negative class $D^{neg}$, $$C_i^p$$

is a cluster in the positive class $D^{pos}$. Let $$(\xi_+^{ij})_t$$

and $$(\xi_-^{ij})_t$$

be the error for data point $x^t$ if it is assigned to cluster $C_i$ and $C_j$ respectively. Define $\phi$ is Gaussian kernel affinities $$\phi(x, y) = \exp\left(-\frac{\|x - y\|^2}{\sigma}\right).$$

We train K(K−1)/2 SVM classifiers corresponding to each pair of clusters $$C_i, C_j \in \mathcal{D}; i = 1, \ldots, K; j = i+1, \ldots, K \text{ and } K = K_{neg} + K_{pos}:$$

$$\min_{w^{ij}, b^{ij}, \xi^{ij}} \frac{1}{2}\|w^{ij}\|^2 + C \sum_{x^t \in C_i \cup C_j} (\xi^{ij})_t \qquad \text{EQ. 1}$$

$$\text{s.t. } (w^{ij})^T x^t + b^{ij} \geq 1 - (\xi^{ij})_t, \forall x^t \in C_i,$$

$$(w^{ij})^T x^t + b^{ij} \leq -1 + (\xi^{ij})_t, \forall x^t \in C_j,$$

$$(\xi^{ij})_t \geq 0, \forall x^t \in C_i \cup C_j,$$

The formulation for finding the cluster assignments for positive class is EQ. 2:

$$\min_{z^{neg}, c^{neg}, u_k^{neg}}$$

$$\sum_{k=1,\dots,K_{neg}} \left( C_1 \sum_{x^t \in \mathcal{D}^{neg}} z_{tk}^{neg} \|x^t - c_k^{neg}\|^2 + C_2 \sum_{x^t \in \mathcal{D}^{pos}} u_k^{neg} \phi(x^t, c_k^{neg}) \right) +$$

$$C_3 \sum_{\substack{x^t \in \mathcal{D}^{neg} \\ i=1,\dots,K_{neg}-1 \\ j=i+1,\dots,K_{neg}}} \left( z_{ti}^{neg}\left(\xi_+^{ij}\right)_t + z_{tj}^{neg}\left(\xi_-^{ij}\right)_t \right) + C_3 \sum_{\substack{x^t \in \mathcal{D}^{neg} \\ i=1,\dots,K_{neg} \\ j=1,\dots,K_{pos}}} z_{ti}^{neg}\left(\xi_+^{i,j+K_{neg}}\right)_t$$

$$\text{s.t.} \sum_{k=1,\dots,K_{neg}} z_{tk}^{neg} = 1, \forall\, x^t \in \mathcal{D}^{neg},$$

$$N_{min} u_k^{neg} \le \sum_{t \in \mathcal{D}^{neg}} z_{tk}^{neg} \le |\mathcal{D}_{neg}| u_k^{neg},$$

$$u_k^{neg} \in \{0, 1\}, z_{tk}^{neg} \in \{0, 1\},$$

$$(k = 1 \dots, K_{neg}),$$

The formulation for finding the cluster assignments for positive class is EQ. 3:

$$\min_{z^{pos}, c_k^{pos}, u_k^{pos}}$$

$$\sum_{k=1,\dots,K_{pos}} \left( C_1 \sum_{x^t \in \mathcal{D}^{pos}} z_{tk}^{pos} \|x^t - c_k^{pos}\|^2 + C_2 \sum_{x^t \in \mathcal{D}^{neg}} u_k^{pos} \phi(x^t, c_k^{pos}) \right)$$

$$+ C_3 \sum_{\substack{x^t \in \mathcal{D}^{pos} \\ i=1,\dots,K_{pos}-1 \\ j=i+1,\dots,K_{pos}}} \left( z_{ti}^{pos}\left(\xi_+^{ij}\right)_t + z_{tj}^{pos}\left(\xi_-^{ij}\right)_t \right) + C_3 \sum_{\substack{x^t \in \mathcal{D}^{pos} \\ i=1,\dots,K_{pos} \\ j=1,\dots,K_{neg}}} z_{ti}^{pos}\left(\xi_+^{i,j+K_{pos}}\right)_t$$

$$\text{s.t.} \sum_{k=1,\dots,K_{pos}} z_{tk}^{pos} = 1, \forall\, x^t \in \mathcal{D}^{pos},$$

$$N_{min} u_k^{pos} \le \sum_{i \in \mathcal{D}^{pos}} z_{tk}^{pos} \le |\mathcal{D}_{pos}| u_k^{pos},$$

$$u_k^{pos} \in \{0, 1\}, z_{tk}^{pos} \in \{0, 1\},$$

$$(k = 1, \dots K_{pos}),$$

There are two sub-problems for clustering the negative class.

$$\min_{z^{neg}, u^{neg}} \sum_{x^t \in \mathcal{D}^{neg}} z_{tk}^{neg} d_{tk}^{neg} + \tag{6}$$

$$\sum_{k=1,\dots,K_{neg}} u_k^{neg} h_k^{neg} + \sum_{\substack{x^t \in \mathcal{D}^{neg} \\ k=1,\dots,K_{neg}-1 \\ j=k+1,\dots,K_{neg}}} z_{tj}^{neg} \frac{D_1}{D_2}\left(\xi^{kj}\right)_t$$

$$\text{s.t.} \sum_{k=1,\dots,K_{neg}} z_{tk}^{neg} = 1, x^t \in \mathcal{D}^{neg}$$

$$N_{min} u_k^{neg} \le \sum_{t \in \mathcal{D}^{neg}} z_{tk}^{neg} \le |\mathcal{D}_{neg}| u_k^{neg},$$

$$u_k^{neg} \in \{0, 1\}, z_{tk}^{neg} \in \{0, 1\}, k = 1, \dots, K_{neg} \text{ where}$$

$$h_k^{neg} = \frac{D_1}{D_2}\sum_{x^t \in \mathcal{D}^{pos}} \phi(x^t, c_k^{neg}) \text{ and}$$

-continued $$d_k^{neg} = \begin{cases} \|x^t - c_k^{neg}\|^2 + \frac{D_1}{D_2}\sum_{j=K_{neg}+1,\dots,K}\left(\xi_+^{kj}\right)_t + \\ \quad \frac{D_1}{D_2}\sum_{j=k+1,\dots,K_{neg}}\left(\xi_+^{kj}\right) \text{ if } k < K_{neg} \\ \|x^t - c_k^{neg}\|^2 + \frac{D_1}{D_2}\sum_{j=K_{neg}+1,\dots,K}\left(\xi_+^{kj}\right)_t \text{ if } k = K_{neg}. \end{cases}$$

and $$\min_{c_k^{neg}} \psi(c_k^{neg}) := \sum_{x^t \in \mathcal{D}^{neg}: z_{tk}^{neg}=1} \|x^t - c_k^{neg}\|^2 + \frac{D_3}{D_2}\sum_{x^t \in \mathcal{D}^{pos}} \phi(x^t, c_k^{neg}) \tag{7}$$

A similar approach for solving the positive class may be performed.

In some embodiments, an optimization algorithm for training the classifier may be performed according to the following exemplary algorithm:

---

Algorithm 1: Multi-Polytope Machine Algorithm - MPM

---

Initialize: Set $\left(\xi_t^{ij}\right)^{(1)} = 0$ for all $i = 1, \dots, K, j = i + 1, \dots, K, x^i \in \mathcal{D}$ for l = 1, 2, . . . do Step 1: Fix $\left(\xi_t^{ij}\right)^{(l)}$, solve the clustering problems EQ.2 and EQ.3 for both positive and negative classes to get $(C_i^n)^{(l)}$ and $(C_i^p)^{(l)}$ for all $i = 1, \dots, K_{neg}, j = 1, \dots, K_{pos}$ Step 2: Fix $(C_i^n)^{(l)}$ and $(C_j^p)^{(l)}$, solve EQ.1 to get $\left(\left(w^{ij}\right)^{(l+1)}, \left(b^{ij}\right)^{(l+1)}\right)$ and $\left(\xi_i^{ij}\right)^{(l+1)}$ end for

---

A more detailed explanation of the multi-polytope machine algorithm is shown in the following.

---

Algorithm 2: Details of MPM

---

Initialization: Select $K_{neg} > 0, K_{pos} > 0, \text{lb} > 0, C, D_i > 0, i = 1, \dots, 3.$ Set $\left(\xi_-^{ij}\right)_t^{(0)} = \left(\xi_+^{ij}\right)_t^{(0)} = 0$ for all $1 < i < j < K, x^i \in \mathcal{D}$ Initialize $(c_k^{neg})^{(1)}$ for EQ.2 on $\mathcal{D}^{neg}$, and similarly $(c_k^{pos})^{(1)}$ for EQ.3 on $\mathcal{D}^{pos}$, by the k-means algorithm.

for l = 1, 2, . . . do

Step 1: Fix $\left(\xi_-^{ij}\right)_t^{(l)}$ and $\left(\xi_+^{ij}\right)_t^{(l)}$, do the following two loops to get $(C_i^n)^{(l)}$ and $(C_j^p)^{(l)}$ for all $i = 1, \dots, K_{neg}, j = 1, \dots, K_{pos}$ /* Clustering the negative class by solving EQ.2 */

Set $(c_k^{neg})^{(l,0)} = (c_k^{neg})^{(l)}$

9
-continued

| Algorithm 2: Details of MPM |
| --- | for m = 1, 2, . . . do

Solve (6) where $z^{neg} \in [0, 1]$ to get $(z^{neg})^{(l,m)}$ and $(u^{neg})^{(l,m)}$ Solve (7) to get $(c_k^{neg})^{(l,m+1)}$ for $(u_k^{neg})^{(l,m)} = 1$ end for $(C_i^n)^{(l)} = \left\{ x^l \in \mathcal{D}^{neg} : \left(z_{tj}^{neg}\right)^{(l,m)} = 1 \right\}$ for all $i = 1, \ldots, K_{neg}$ /* Clustering the positive class */

Set $(c_k^{pos})^{(l,0)} = (c_k^{pos})^{(l)}$

Apply the second loop using alternating optimization for the positive class EQ. 3 to get $(z^{pos})^{(l,m)} \left(C_j^p\right)^{(l)} = \left\{ x^l \in \mathcal{D}^{pos} : \left(z_{tj}^{pos}\right)^{(l,m)} = 1 \right\}$ for all $j = 1, \ldots, K_{pos}$ Step 2: Fix $(C_i^n)^{(l)}$ and $(C_j^p)^{(l)}$, solve (1) to get $(w^{ij})^{(l)}$ and $(b^{ij})^{(l)}$ Step 3: Update $\left(\xi_{-}^{ij}\right)_t^{(l)}$ and $\left(\xi_{+}^{ij}\right)_t^{(l)}$ for all $1 \leq i < j \leq K, x^l \in \mathcal{D}$.

end for

Example Methodology

Figure 3:
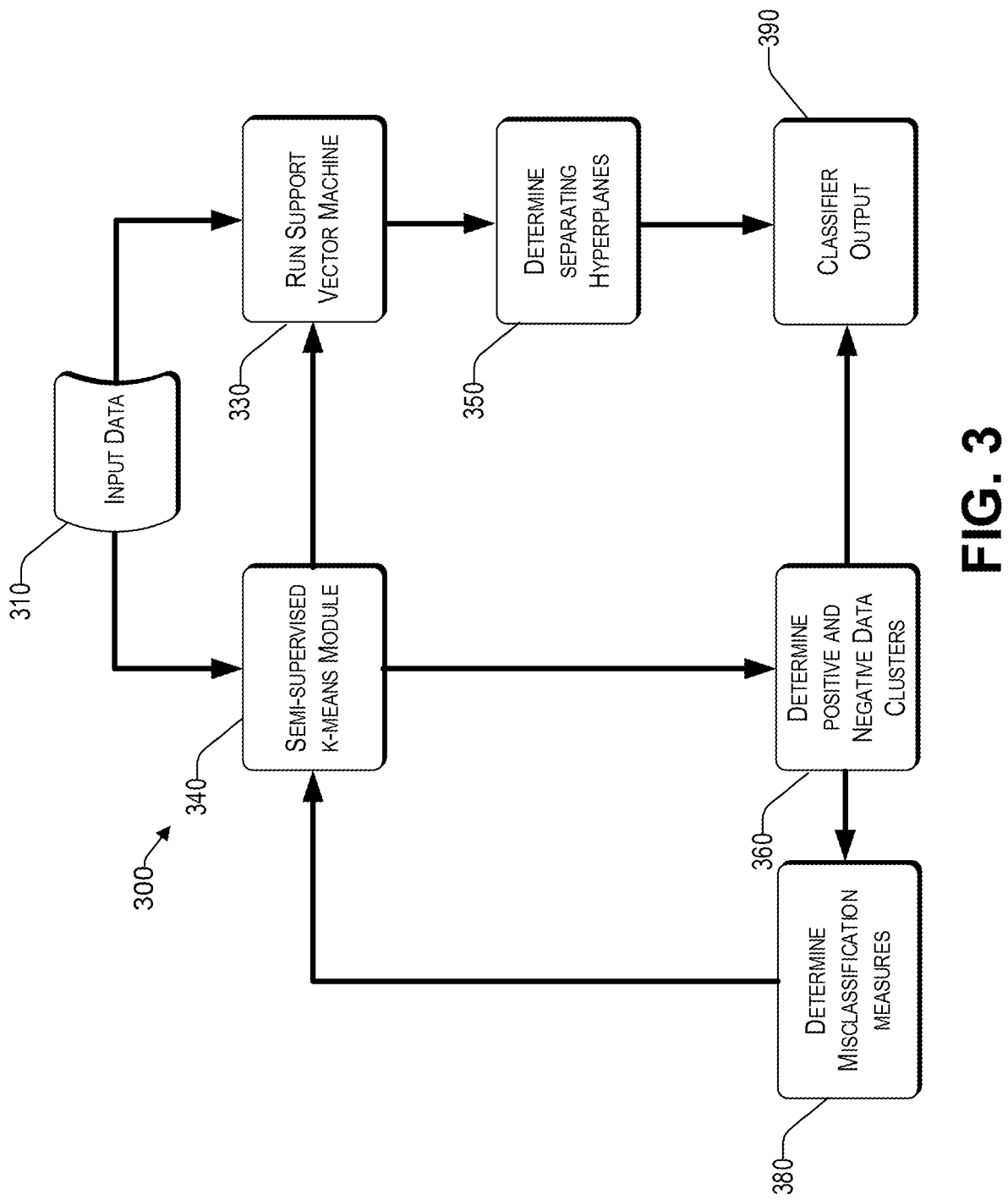
FIG. 3 is a flowchart of a method for binary and multi-class classification in machine learning systems, according to some embodiments.

Referring now to FIG. 3, a method 300 for binary and multi-class classification in machine learning systems is shown according to an exemplary embodiment. In general, when input data 310 is received for classification, the system (for example, the classifier engine 110 in the machine learning classification server 116) may perform concurrently run classification processes on the data. The left side of the flow represents a regularized semi-supervised k-means process. As should be understood when reviewing the equations shown above and described with respect to FIG. 2, the process adds three more terms to the functions shown in Eqs. 2 and 3. The right side represents a SVM approach for separation of the data points. Data from one sub-process is used in coordination with data being generated from the other sub-process. Accordingly, while one sub-process will be described before the other sub-process, it will be understood that embodiments may not necessarily perform one sub-process before the other.

Block 340 represent the k-means module applying the regularized, semi-supervised k-means process to the data set. The k-means module determines 360 which data points are labeled as positive data points and which data points are labeled as negative data points. The positive data points may be clustered separately from the negative data points. During the clustering process, information from one of the classes may be used as a side constraint for another class. In one aspect, the process is able to generate negative clusters that are well-separated from the positive class. The desired separation can be achieved by pushing the centroid $c_k^{neg}$

10 away from $D^{pos}$ through Gaussian kernel affinities. In some embodiments, a Gaussian kernel may be used to emphasize the impact of the nearest points in $D^{pos}$ to the centroid $c_k^{neg}$ of the k-in cluster, and discard the role of the remote points. In some embodiments, misclassification measures may be determined 380 and used to train the regularized, semi-supervised k-means process for clustering. An example of clustering according to the regularized, semi-supervised k-means process may be seen in block 210 of FIG. 2.

Figure 4:
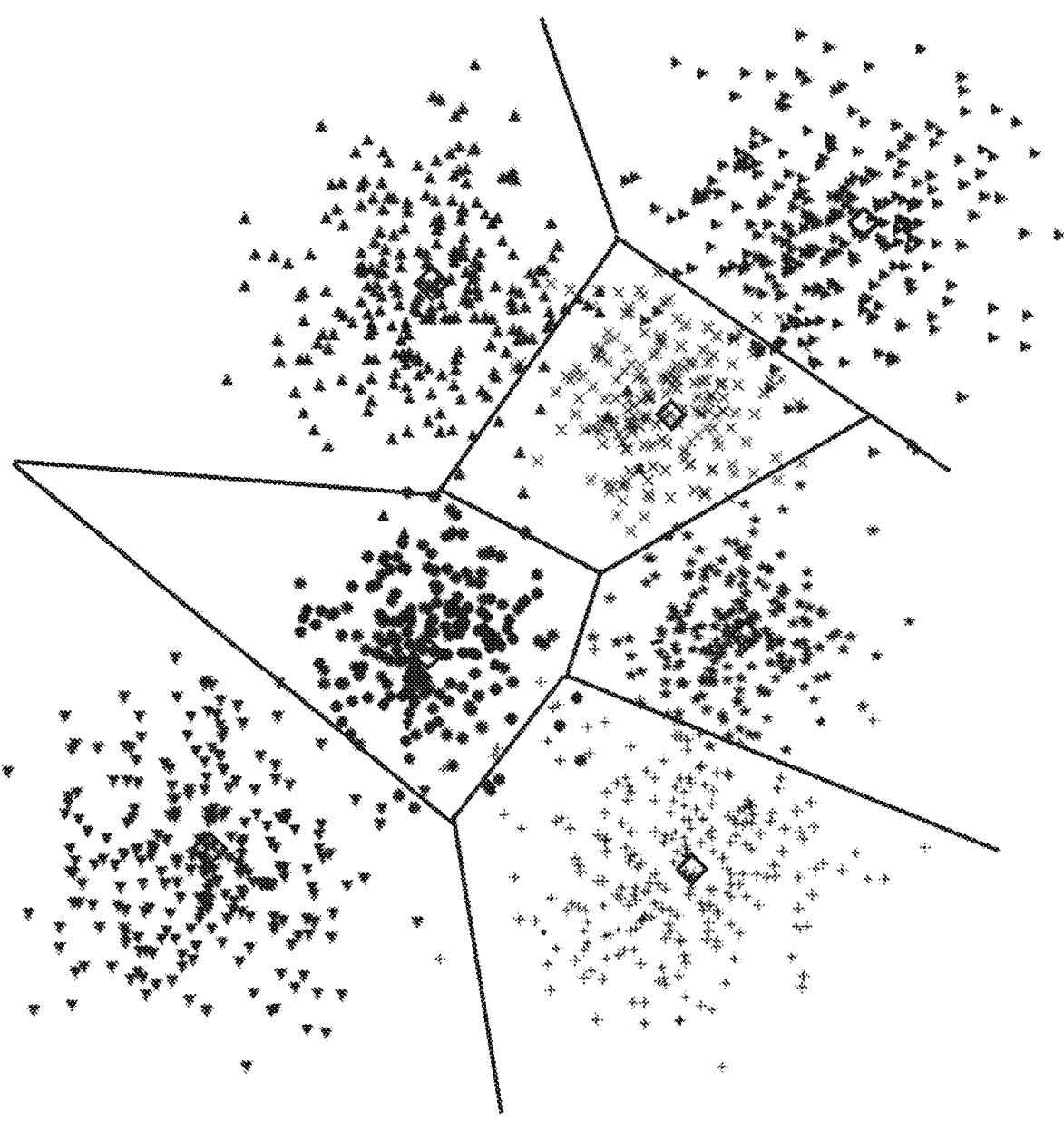
FIG. 4 is a diagrammatic view of a hyperplane based multi-polytope classification, according to some embodiments.
Figure 5:
FIG. 5 is a diagrammatic view of a hyperplane based multi-polytope classification using non-linear boundaries, according to some embodiments.

In an example embodiment, the SVM process may be run 330 on the data set to separate data points to find separators which give a minimal mis-classification. Hyperplanes may be determined 350 that separate clusters of data points. The SVM is used to find the separators with large margins. An example of a linear multi-polytope separation is shown in FIG. 4. In some embodiments, the classifier engine 110 may be configured to determine non-linear boundaries in a multi-polytope cluster. For a non-linear separator, embodiments may use a kernel SVM in the dual space. FIG. 5 shows non-linear boundaries determined by the subject technology for classified data points.

Example Computer Platform

Figure 6:
FIG. 6 is a functional block diagram illustration of a particularly configured computer hardware platform that can communicate with various networked components, consistent with an illustrative embodiment.
Figure 6:
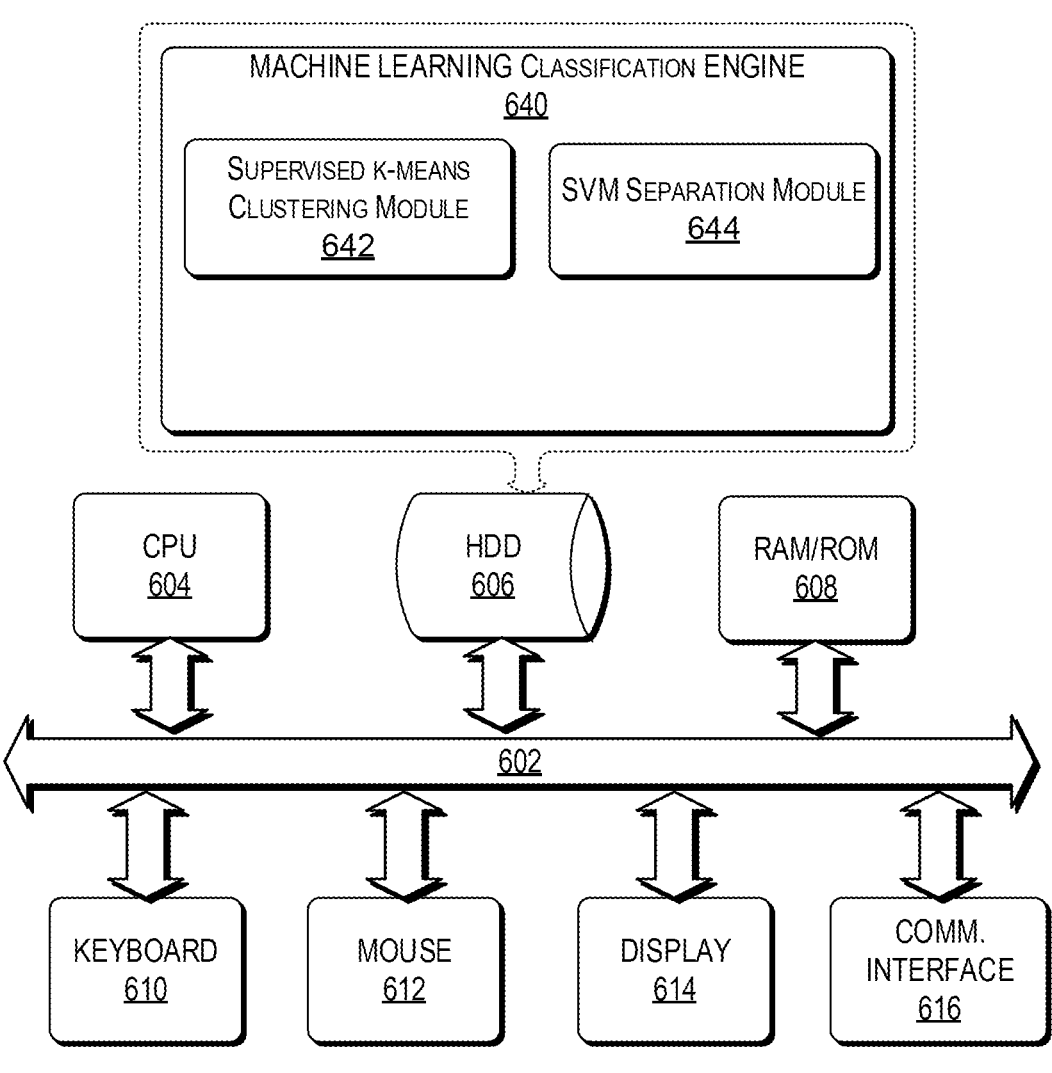

As discussed above, functions relating to interpretable modeling of the subject disclosure can be performed with the use of one or more computing devices connected for data communication via wireless or wired communication, as shown in FIG. 1. FIG. 6 is a functional block diagram illustration of a particularly configured computer hardware platform that can communicate with various networked components, such as the classifier engine 110, the cloud 120, etc. In particular, FIG. 6 illustrates a network or host computer platform 600, as may be used to implement a server, such as the machine learning classification server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the machine learning classification engine 640, in a manner described herein. The machine learning classification engine 640 may have various modules configured to perform different functions.

For example, the machine learning classification engine 640 may include the k-means clustering module 642 and the SVM Separation module 644, whose functions have been previously described, for example in FIG. 3.

Example Cloud Platform

As discussed above, functions relating to data processing using a machine learning model to discover new materials for application specific tasks (for example carbon dioxide separation), may include a cloud computing environment 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
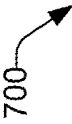
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
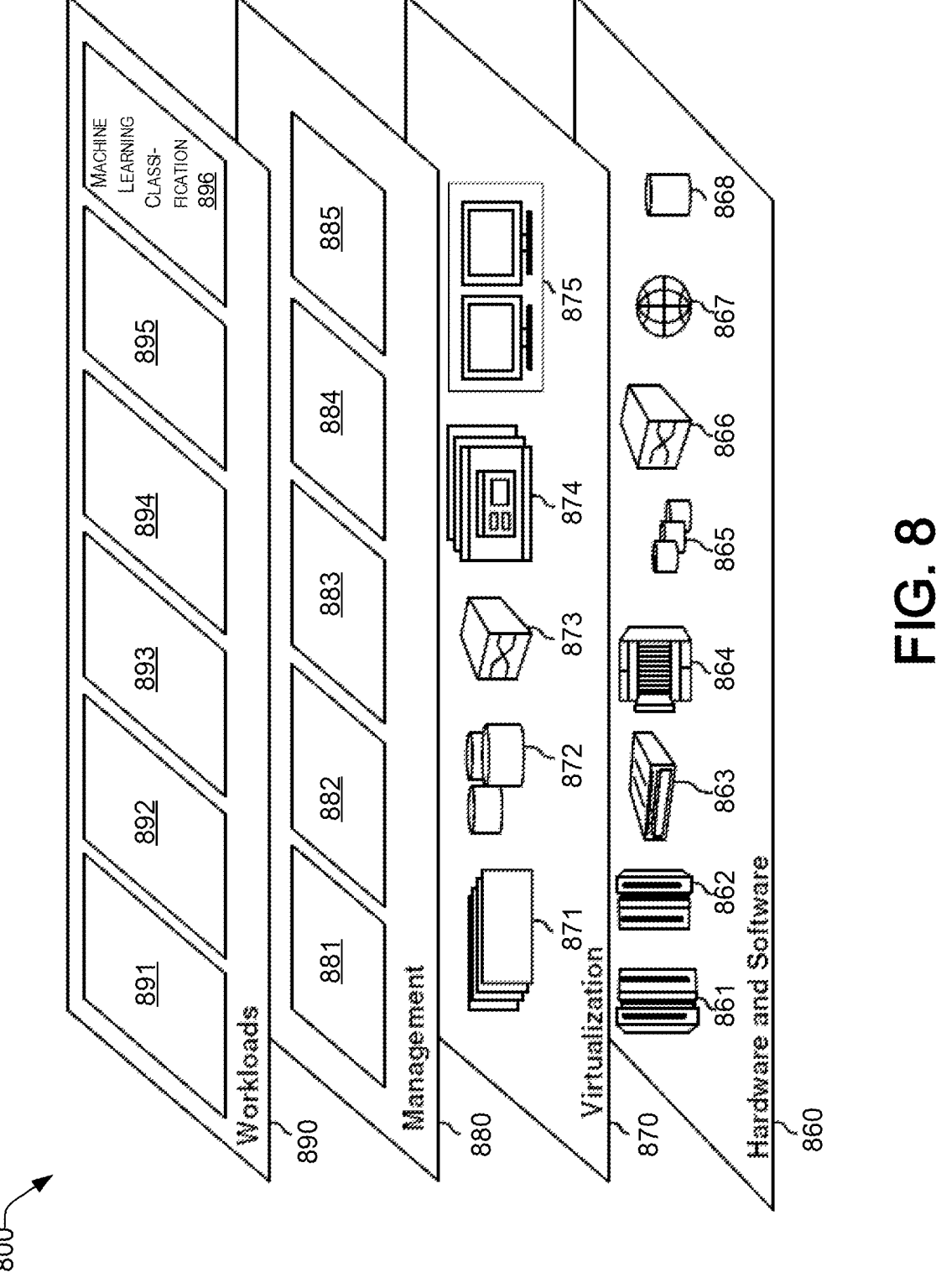
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and machine learning classification 896, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for improving an efficiency of a computing device in generating a classifier engine for machine learning, the computer-implemented method comprising:

receiving a plurality of data points;

applying a semi-supervised k-means process to a first set of data points of the plurality of data points and a second set of data points of the plurality of data points, wherein the first set of data points is labeled with a first class of a plurality of classes and the second set of data points is labeled with a second class of the plurality of classes, different from the first class;

clustering the first set of data points and the second set of data points into a first plurality of clusters and a second plurality of clusters, respectively, using the semi-supervised k-means process;

constructing multi-polytopes for the first plurality of clusters and the second plurality of clusters;

training, based on the constructing of the multi-polytopes, a plurality of support vector machine (SVM) classifiers, wherein each SVM classifier of the plurality of SVM classifiers is trained on a respective pair of clusters within the first plurality of clusters and the second plurality of clusters;

determining, using the trained plurality of SVM classifiers, separation hyperplanes for the first plurality of clusters and the second plurality of clusters; and determining labels for each cluster of the first plurality of clusters and each cluster of the second plurality of clusters, based on the separation hyperplanes.

2. The computer-implemented method of claim 1, further comprising clustering positive classes of data points of the plurality of data points separately from negative classes of data points of the plurality of data points.

3. The computer-implemented method of claim 1, further comprising:

identifying information from one of the first plurality of clusters or the second plurality of clusters; and using the identified information as a constraint in determining remaining of the one of the first plurality of clusters or the second plurality of clusters.

4. The computer-implemented method of claim 1, further comprising:

determining misclassification measurements in the first plurality of clusters and the second plurality of clusters; and training the semi-supervised k-means process for improved clustering based on the misclassification measurements.

5. The computer-implemented method of claim 1, wherein the separation hyperplanes are non-linear boundaries between the respective pair of clusters.

6. The computer-implemented method of claim 1, wherein the semi-supervised k-means process is regularized.

7. A computer program product for improving a computing efficiency of a computing device in generating a classifier engine for machine learning, the computer program product comprising:

one or more non-transitory computer readable storage media, and program instructions collectively stored on the one or more non-transitory computer readable storage media, the program instructions comprising:

receiving a plurality of data points;

applying a semi-supervised k-means process to a first set of data points of the plurality of data points and a second set of data points of the plurality of data points, wherein the first set of data points is labeled with a first class of a plurality of classes, and the second set of data points is labeled with a second class of the plurality of classes, different from the first class;

clustering the first set of data points and the second set of data points into a first plurality of clusters and a second plurality of clusters, respectively, using the semi-supervised k-means process;

constructing multi-polytopes for the first plurality of clusters and the second plurality of clusters;

training, based on the constructing of the multi-polytopes, a plurality of support vector machine (SVM) classifiers, wherein each SVM classifier of the plurality of SVM classifiers is trained on a respective pair of clusters within the first plurality of clusters and the second plurality of clusters;

determining, using the trained plurality of SVM classifiers, separation hyperplanes for the first plurality of clusters and the second plurality of clusters; and determining labels for each cluster of the first plurality of clusters and each cluster of the second plurality of clusters, based on the separation hyperplanes.

8. The computer program product of claim 7, wherein the program instructions further comprise clustering positive classes of data points of the plurality of data points separately from negative classes of data points of the plurality of data points.

9. The computer program product of claim 7, wherein the program instructions further comprise:

identifying information from one of the first plurality of clusters or the second plurality of clusters; and using the identified information as a constraint in determining remaining of the one of the first plurality of clusters or the second plurality of clusters.

10. The computer program product of claim 7, wherein the program instructions further comprise:

determining misclassification measurements in the first plurality of clusters and the second plurality of clusters; and training the semi-supervised k-means process for improved clustering based on the misclassification measurements.

11. The computer program product of claim 7, wherein the separation hyperplanes are non-linear boundaries between the respective pair of clusters.

12. The computer program product of claim 7, wherein the semi-supervised k-means process is regularized.

13. A computer server for improving computational efficiency in generating a classifier engine for machine learning, the computer server comprising:

a network connection;

one or more computer readable storage media;

a processor coupled to the network connection and coupled to the one or more computer readable storage media; and a computer program product comprising program instructions collectively stored on the one or more computer readable storage media, the program instructions comprising:

receiving a plurality of data points;

applying a semi-supervised k-means process to a first set of data points of the plurality of data points and a second set of data points of the plurality of data points, wherein the first set of data points is labeled with a first class of a plurality of classes, and the second set of data points is labeled with a second class of the plurality of classes, different from the first class;

clustering the first set of data points and the second set of data points into a first plurality of clusters and a second plurality of clusters, respectively, using the semi-supervised k-means process;

constructing multi-polytopes for the first plurality of clusters and the second plurality of clusters;

training, based on the constructing of the multi-polytopes, a plurality of support vector machine (SVM) classifiers, wherein each SVM classifier of the plurality of SVM classifiers is trained on a respective pair of clusters within the first plurality of clusters and the second plurality of clusters;

determining, using the trained plurality of SVM classifiers, separation hyperplanes for the first plurality of clusters and the second plurality of clusters; and determining labels for each cluster of the first plurality of clusters and each cluster of the second plurality of clusters, based on the separation hyperplanes.

14. The computer server of claim 13, wherein the program instructions further comprise clustering positive classes of data points of the plurality of data points separately from negative classes of data points of the plurality of data points.

15. The computer server of claim 13, wherein the program instructions further comprise:

identifying information from one of the first plurality of clusters or the second plurality of clusters; and using the identified information as a constraint in determining remaining of the one of the first plurality of clusters or the second plurality of clusters.

16. The computer server of claim 13, wherein the program instructions further comprise:

determining misclassification measurements in the first plurality of clusters and the second plurality of clusters clustered; and training the semi-supervised k-means process for improved clustering based on the misclassification measurements.

17. The computer server of claim 13, wherein the semi-supervised k-means process is regularized.

18. A software as a service (SaaS) computer-implemented method for improving a computational efficiency in generating a classifier engine for machine learning, the SaaS computer-implemented comprising:

receiving a plurality of data points and a request for classification services from a remote user through a network connection;

applying, by a local computer server, a semi-supervised k-means process to a first set of data points of the plurality of data points and a second set of data points of the plurality of data points, wherein the first set of data points is labeled with a first class of a plurality of classes, and the second set of data points is labeled with a second class of the plurality of classes, different from the first class;

clustering the first set of data points and the second set of data points into a first plurality of clusters and a second plurality of clusters, respectively, using the semi-supervised k-means process;

constructing multi-polytopes for the first plurality of clusters and the second plurality of clusters;

training, based on the constructing of the multi-polytopes, a plurality of support vector machine (SVM) classifiers, wherein each SVM classifier of the plurality of SVM classifiers is trained on a respective pair of clusters within the first plurality of clusters and the second plurality of clusters;

determining, using the trained plurality of SVM classifiers, separation hyperplanes for the first plurality of clusters and the second plurality of clusters;

determining labels for each cluster of the first plurality of clusters and each cluster of the second plurality of clusters, based on the separation hyperplanes; and providing the determined labels for each cluster of the first plurality of clusters and each cluster of the second plurality of clusters, to the remote user.

19. The SaaS computer-implemented method of claim 18, further comprising clustering positive classes of data points of the plurality of data points separately from negative classes of data points of the plurality of data points.

20. The SaaS computer-implemented method of claim 18, further comprising:

identifying information from one of the first plurality of clusters or the second plurality of clusters; and using the identified information as a constraint in determining remaining of the one of the first plurality of clusters or the second plurality of clusters.

21. The SaaS computer-implemented method of claim 18, further comprising:

determining misclassification measurements in the first plurality of clusters and the second plurality of clusters clustered; and training the semi-supervised k-means process for improved clustering based on the misclassification measurements.

22. The SaaS computer-implemented method of claim 18, wherein the separation hyperplanes are non-linear boundaries between the respective pair of clusters.

\* \* \* \* \*